P. EHRHARDT.
MEANS FOR THE APPLICATION OF SOLID PHARMACEUTICAL PREPARATIONS OR PRODUCTS.
APPLICATION FILED JAN. 19, 1918.
1,264,781. Patented Apr. 30, 1918.
Fig. 1.
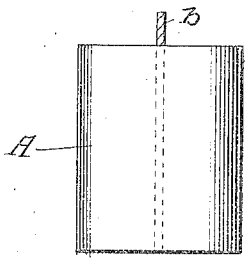
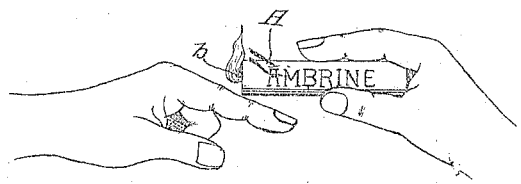
Fig. 2.
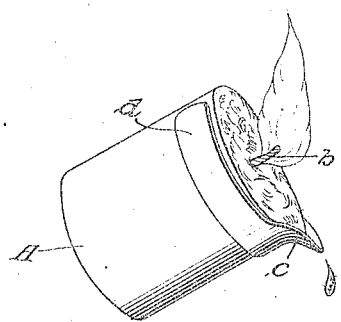
Fig. 3.
Witness
J. H. Crawford
Inventor
Pierre Ehrhardt,
By A. B. Foster
Attorney

UNITED STATES PATENT OFFICE.

PIERRE EHRHARDT, OF PARIS, FRANCE.

MEANS FOR THE APPLICATION OF SOLID PHARMACEUTICAL PREPARATIONS OR PRODUCTS.

1,264,781.      Specification of Letters Patent.      Patented Apr. 30, 1918.

Application filed January 19, 1918. Serial No. 212,710.

*To all whom it may concern:*

Be it known that I, PIERRE EHRHARDT, citizen of the Republic of France, residing at 95 Rue Jouffroy, Paris, France, have invented new and useful Improved Means for the Application of Solid Pharmaceutical Preparations or Products, of which the following is a specification.

In order to apply to the skin, or to a wound, pharmaceutical preparations, or products which will liquefy by moderate heat such as those with a paraffin base, for example "ambrine," or imitations thereof, they have been melted in a saucepan, or pot, or the like, sometimes in a sand-bath or water bath and they have then been sprayed or brushed on the part affected. Therefore for the application of such preparations, or products, to burns or other portions of the body to which such application is desired, the following have been required: A heater for bringing the preparation to the required temperature. A sterilized vessel. A sterilized brush, and a thermometer to prevent the mixture being applied at so high a temperature as to be likely to injure the patient. These of course it is frequently impossible to have at hand immediately on the occurrence of an accident and, in any case, they require some time to prepare and special knowledge, or skill, are required in sterilizing. My invention provides means whereby these objections are overcome.

According to my invention I give the solid preparations, or products, what may be termed a stick of cylindrical, oval, octagonal, or other shape, preferably a litle larger in diameter than an ordinary candle, and I provide it with a wick passing through the axis and I also preferably surround it with a protective envelop such for example as a sheet of paraffined paper or other suitable coating.

The way in which my invention can be performed will be fully understood from the following description with reference to the accompanying drawing in which Figure 1 is a side view of a stick A of enveloped "Ambrine" for example (although it may be any other suitable preparation, or product,) provided with a wick $b$ which may be of cotton or any other suitable substance. Fig. 2 is a view showing the manner of using the stick after the wick has been lighted by inclining the stick to allow the melted product to run directly onto the skin or the wound. Fig. 3 is a perspective view showing the stick provided with a beak or spout $c$ which may be attached to the stick by means of a clip, or collar-piece, $d$, which may, for example, be formed of two flexible branches embracing the stick and capable of being moved downwardly on the candle, as the latter is consumed, the melted waxy matter running into the beak or spout being thereby easily and regularly directed onto the skin, or wound, at the particular point desired.

In order to apply to a wound absolutely sterile matter I prefer, in the manufacture of the candle, to bring the said matter to a temperature sufficient to assure perfect sterility and after allowing the temperature to fall to about 60° centigrade and then to introduce it into the mold in which there may be provided a sheath of protective material such as paraffined paper, or other material, which will completely surround the stick which is formed after the matter cools, and serve as a protecting envelop for it.

This protective envelop can be of a nature which will burn when the wick of the stick or candle is lighted.

The said envelop protects the preparation, or product, from external impurities which will be thereby prevented from being taken up by the "ambrine", or other like material of which the candle is made. The envelop when it burns produces a small flame which destroys all these impurities and consequently the melted matter can be poured onto a wound in a sufficiently sterilized condition.

"Ambrine" herein referred to, is a composition of matter composed largely of paraffin, or like material, mixed in molten condition with relatively small amounts or resinous material, and is indicated as a dressing for burns, or as a surgical dressing generally, or as a dressing recommended in the treatment of all affections wherein treatment by heat is desired, or generally whenever it is desired to apply to the living body a coating of a liquid material which upon cooling to body temperature produces an adherent covering layer which will be somewhat flexible, which covering may possess medicinal, curative, occlusive or pharmaceutical properties.—

What I claim is:

1. A process of applying a dressing composed of a composition which at normal body temperature is of a waxy consistency but which melts at a somewhat higher temperature to produce a liquid which can be allowed to flow onto the living body without injury thereto, such process comprising the step of melting successive portions thereof by substantial contact therewith of a flame whereby such portions are progressively melted and at least partially sterilized, and in causing such melted portions to flow onto that portion of the living body to which such application is desired.

2. The method of applying medicaments of a composition comprising substances of wax-like nature solid at normal body temperature but melting at a temperature sufficiently low to permit of application to the body without injury thereto, consisting in providing such mass with a wick and in igniting the wick so that the heat of the flame thereof will liquefy the adjacent portions of the mass and in causing such liquefied portion to flow upon the surface or part of the body desired to be coated therewith.

3. A candle comprising a wick embedded in a pharmaceutical preparation which is a semi-plastic solid at normal body temperature, and which possesses curative properties and is capable of sticking to portions of the living body in the form of a layer which is easily removable when cold, said candle being provided with a casing impervious to bacteria, which casing is also combustible.

4. A candle made of a solid meltable pharmaceutical preparation or product, provided with a spout held thereon by means of a collar or clip, at least partially encircling the said candle.

5. A candle composed of paraffinous material and other substance capable of blending therewith to form a composition having curative properties when applied locally, said composition being sufficiently combustible to burn as a candle and liquid at a temperature sufficiently low to permit of its application to the living body without injury thereto, and having a wick embedded therein, whereby on ignition of such wick the molten material may be caused to flow directly onto the affected parts of the living body.

6. The process of forming a candle of pharmaceutical preparation which melts at a sufficiently low temperature so that in the liquid state, it can be applied to the living body without injury, consisting in pouring the molten preparation around a wick, into a mold lined with a combustible sheath, such sheath thereby forming a casing impervious to bacteria, which casing will burn proportionally to the consumption of the said candle.

In testimony whereof I have signed my name to this specification in the presence of two subscribing witnesses.

PIERRE EHRHARDT.

Witnesses:
CHAS. P. PRESSLY,
HENRI CARTIER.